United States Patent
Lunacek et al.

[19]

[11] Patent Number: 6,049,299
[45] Date of Patent: Apr. 11, 2000

[54] DITHERING AN ANALOG SIGNAL TO IMPROVE MEASUREMENT

[75] Inventors: Michael G. Lunacek, La Crescent, Minn.; Robert M. Swanson, La Crosse, Wis.

[73] Assignee: American Standard Inc., Piscataway, N.J.

[21] Appl. No.: 08/693,841

[22] Filed: Aug. 2, 1996

Related U.S. Application Data

[62] Division of application No. 08/377,321, Jan. 24, 1995.

[51] Int. Cl.$^7$ ..................................................... H03M 1/20
[52] U.S. Cl. ............................................ 341/131; 341/155
[58] Field of Search ................................... 341/118, 120, 341/131, 155

[56] References Cited

U.S. PATENT DOCUMENTS

| | | | |
|---|---|---|---|
| 3,592,240 | 7/1971 | Hedrick | 137/316 |
| 4,082,114 | 4/1978 | Hantke et al. | 137/625 |
| 4,124,037 | 11/1978 | Siegwart | 137/499 |
| 4,177,970 | 12/1979 | Ring, Jr. | 251/61 |
| 4,200,117 | 4/1980 | Anderson et al. | 137/512 |
| 4,276,818 | 7/1981 | Makara et al. | 98/40 |
| 4,305,418 | 12/1981 | Jensen et al. | 137/219 |
| 4,336,749 | 6/1982 | Barnhart et al. | 98/43 |
| 4,344,330 | 8/1982 | Renken et al. | 73/861 |
| 4,366,830 | 1/1983 | Becelaere | 137/75 |
| 4,372,342 | 2/1983 | McCabe | 137/601 |
| 4,372,485 | 2/1983 | McCabe | 236/1 |
| 4,390,123 | 6/1983 | McCabe | 236/16 |
| 4,397,223 | 8/1983 | Maxson | 98/40 |
| 4,432,272 | 2/1984 | Becelaere | 98/1 |
| 4,487,214 | 12/1984 | Tatum | 137/72 |
| 4,628,954 | 12/1986 | Dayus | 137/75 |
| 4,633,900 | 1/1987 | Suzuki | 137/504 |
| 4,646,964 | 3/1987 | Parker et al. | 236/49 |
| 4,678,005 | 7/1987 | Aalto et al. | 137/499 |
| 4,694,851 | 9/1987 | Aalto et al. | 137/499 |
| 4,710,747 | 12/1987 | Holland | 341/120 |
| 4,723,481 | 2/1988 | Hart et al. | 98/121 |
| 4,749,000 | 6/1988 | Ring et al. | 137/219 |
| 4,749,001 | 6/1988 | Ring et al. | 137/219 |
| 4,775,133 | 10/1988 | Ring et al. | 251/129 |
| 4,817,508 | 4/1989 | Prochnow | 98/41 |
| 4,884,590 | 12/1989 | Eber et al. | 137/1 |
| 4,917,350 | 4/1990 | Beyer et al. | 251/129 |
| 5,050,638 | 9/1991 | Zeller et al. | 137/553 |
| 5,090,445 | 2/1992 | Jackson | 137/527 |
| 5,113,910 | 5/1992 | Ball | 137/630 |
| 5,169,121 | 12/1992 | Blanco et al. | 251/129 |
| 5,234,021 | 8/1993 | Kozlak et al. | 137/487 |
| 5,266,951 | 11/1993 | Kuegler et al. | 341/120 |
| 5,276,630 | 1/1994 | Baldwin et al. | 364/505 |
| 5,324,229 | 6/1994 | Weisbecker | 454/233 |
| 5,333,835 | 8/1994 | Smith et al. | 251/129 |
| 5,674,125 | 10/1997 | Xia et al. | 454/327 |

OTHER PUBLICATIONS

ASHRAE Standard 62–1989; "Ventilation for Acceptable Indoor Air Quality"; 1989.
Swager, Anne Watson; "Averaging Increases Microprocessor's ADC Resolution"; Feb. 1, 1990.
Koljonen, Tuomas and Vuori, Jarkko; "Averaging Increases ADC Resolution"; Feb. 28, 1990.

Primary Examiner—Michael Tokar
Assistant Examiner—Peguy JeanPierre
Attorney, Agent, or Firm—William J. Beres; William O'Driscoll; Peter D. Ferguson

[57] ABSTRACT

A method of measurement. The method comprises the steps of (a) measuring a value, (b) forwarding the measured value as an analog signal, (c) dithering the analog signal to improve resolution and (d) converting the analog signal to a digital signal.

10 Claims, 8 Drawing Sheets

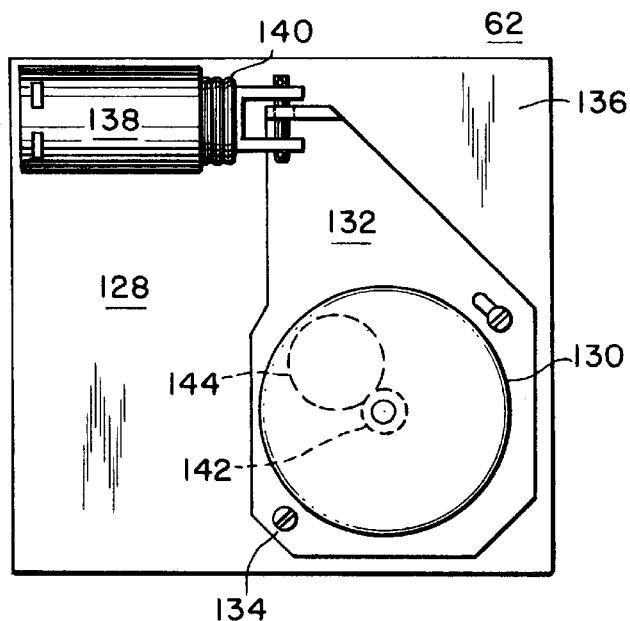
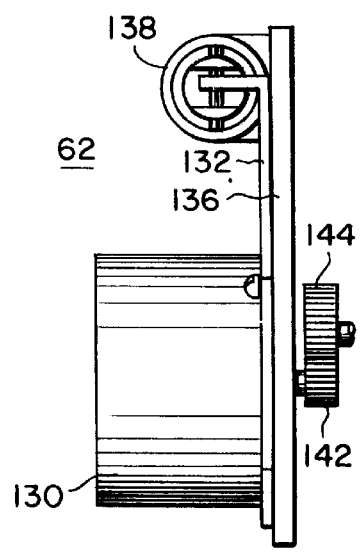
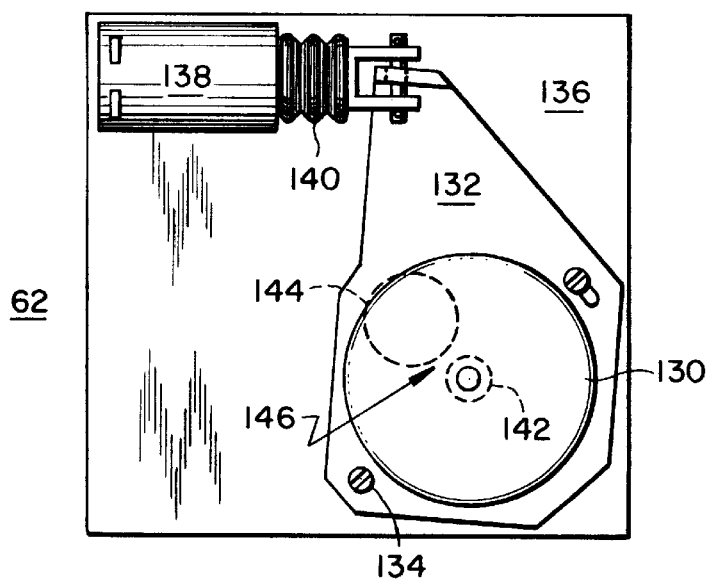

| | A | B | C |
|---|---|---|---|
| 230 | SIGNAL | PRIOR AREA | DITHERED AREA |
| | 206 | 220 | X% IN 222<br>Y% IN 220 |
| | 210 | 220 | Z% IN 220<br>W% IN 224 |
FIG. 17
FIG. 18
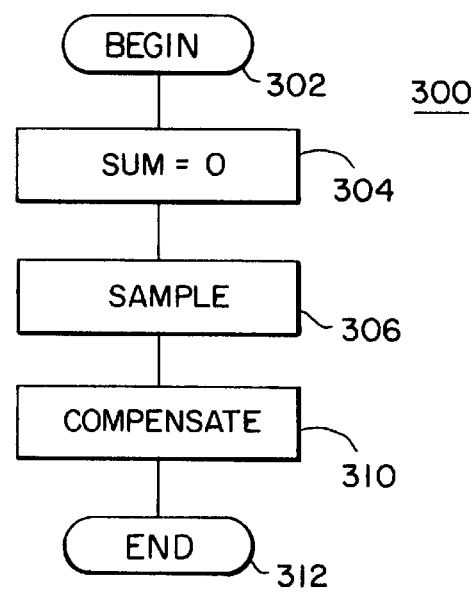
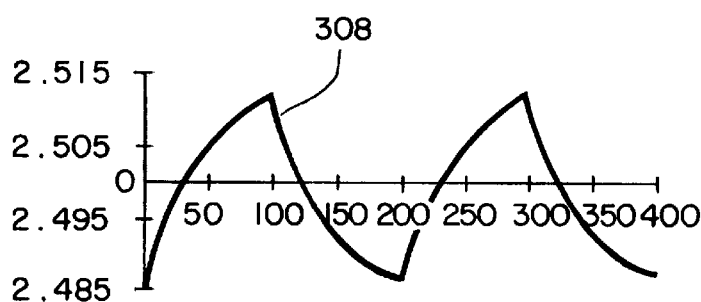
FIG. 19
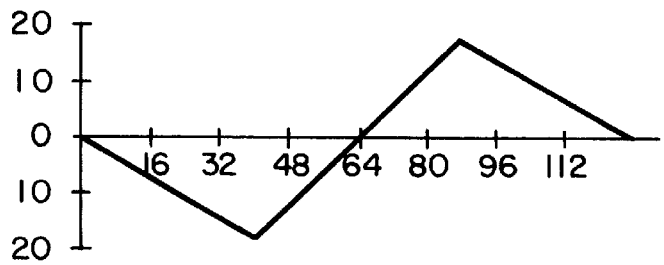
FIG. 20

DITHERING AN ANALOG SIGNAL TO IMPROVE MEASUREMENT

This application is a division of application No. 08/377,321, filed Jan. 24, 1995, pending.

BACKGROUND OF THE INVENTION

The present invention is directed to a flow modulating device used to control and monitor airflow. In particular, the device is intended to modulate and monitor the amount of fresh air being provided to the air conditioning system of a building. In an alternative embodiment, the device also mixes the fresh air with return air. Circuitry to improve the resolution of airflow measurement is also described.

Indoor air quality (IAQ) affects everyone involved with building design, construction, operation, use and maintenance. Sick buildings can result in sick occupants; sick occupants are less productive, don't renew their leases, and tend to sue everyone involved.

Consequently, building system designers must comply with the requirements of ASHRAE Standard 62-89 "Ventilation for Acceptable Indoor Air Quality". In broad terms, ASHRAE 62-89 specifies requirements intended to control microbial growth and to provide adequate ventilation for contaminant dilution. Included are two methods of providing adequate ventilation: the ventilation rate procedure and the indoor air quality (IAQ) procedure. The ventilation rate procedure specifies minimum outdoor airflow rates for adequate dilution, while the indoor air quality procedure specifies contaminant levels and subjective evaluation for acceptable indoor air quality. Most designers choose the ventilation rate procedure since it is prescriptive and seems less risky than the IAQ procedure. Designers tend to avoid the IAQ procedure because it seems open ended and subject to multiple interpretations.

The ventilation rate procedure provides a prescriptive path to compliance. It defines acceptable indoor air quality in terms of minimum ventilation airflow for contaminant dilution. A table lists ventilation airflow requirements for spaces and a simple equation determines system level outdoor airflow requirements for multiple space systems. Many designers prefer the ventilation rate procedure since it presents an objective ventilation design approach.

Devices for controlling the intake of fresh air are known. For example, U.S. Pat. No. 4,200,117 to Anderson et al. shows a device including a pair of closure members pivoted relative to a transverse axis and biased to the closed position by a spring. U.S. Pat. No. 5,324,229 to Weisbecker shows a two section damper including a fresh air inlet and a mixing section to prevent stratification. U.S. Pat. No. 5,276,630 to Baldwin et al. also discloses an outside air connection controlled by a damper. The Baldwin et al. patent and the Weisbecker patent are assigned to the assignee of the present invention and are hereby incorporated by reference.

SUMMARY OF THE INVENTION

There is a need to supply fresh air in known volumes. There is also a need to mix fresh air with return air. There is a need to close the fresh air damper in the event of a power loss. There is also a need to control airflow in a linear manner as the fresh air damper opens. There is also a need to improve the measurement of fresh air airflow.

The present invention provides a device for monitoring and modulating the admission of fresh air into a building. The device comprises a housing; a sensor associated with the housing and operable to measure airflow through the housing; and a damper including at least two damper blades. Each damper blade includes a shaft rotatably attached to the is housing at least at a first shaft end. The shaft is located on the surface of the damper blade so as to divide the surface into first and second substantially equal areas.

The present invention further provides an airflow modulation device comprising a housing supporting a flow ring; a first damper blade; and a second damper blade. Each of the first and second damper blades includes a first edge which is substantially straight, a second edge which is substantially arced and a shaft being attached to each damper blade in the plane of the damper blade. The shaft is movably attached to the housing and located so as to divide the surface of the damper blade into first and second surfaces. The area of the first surface is substantially identical to the area of the second surface.

The present invention also provides a flow swirl generator comprising a housing and at least two arced damper blades. Each blade is centroidally supported by a shaft where the shaft has a first end rotatably supported by the housing and a second end rotatably supported by a central pivot point.

The present invention additionally provides a method of measurement comprising the steps of: measuring a value; forwarding measured value as an analog signal; dithering the analog signal to improve resolution; and converting the analog signal to a digital signal.

The present invention still further provides a method of providing analog to digital a conversion comprising the steps of: receiving an analog signal; dithering the analog signal with a known signal; taking multiple samples of the dithered signal with an analog to digital converter; and interpolating a resultant digital signal.

The present invention yet further provides apparatus for providing 13 bit resolution of a measured analog signal using an 8 bit analog to digital converter. The apparatus comprises an analog sensor which provides a measured signal on an output line A; a filter circuit receiving the analog signal; a dither circuit superimposing a known signal on the filtered analog signal; and a microprocessor and analog to digital converter for receiving and sampling the dithered and filtered analog signal.

BRIEF DESCRIPTION OF THE DRAWINGS

FIG. 6 is a view of a gear train drive release in the powered position as used with the present invention.

FIG. 7 is a view of the gear train release of FIG. 6 shown in the unpowered position.

FIG. 8 is a side view of the gear train release of FIG. 6.

FIG. 17 is a table of the signal described with reference to FIG. 15.

FIG. 18 is a flow chart of the invention described with respect to FIG. 15.

FIG. 19 is an exemplary signal superimposed on an analog signal in accordance with the invention described with respect to FIG. 15.

FIG. 20 is a graph of the compensation table of the invention with reference to FIG. 15.

DETAILED DESCRIPTION OF THE INVENTION

The present invention is directed to a flow modulation device for controlling and measuring the amount of outdoor air provided to an HVAC system. In an alternative embodiment a flow swirl generator is also described.

Figure 1:
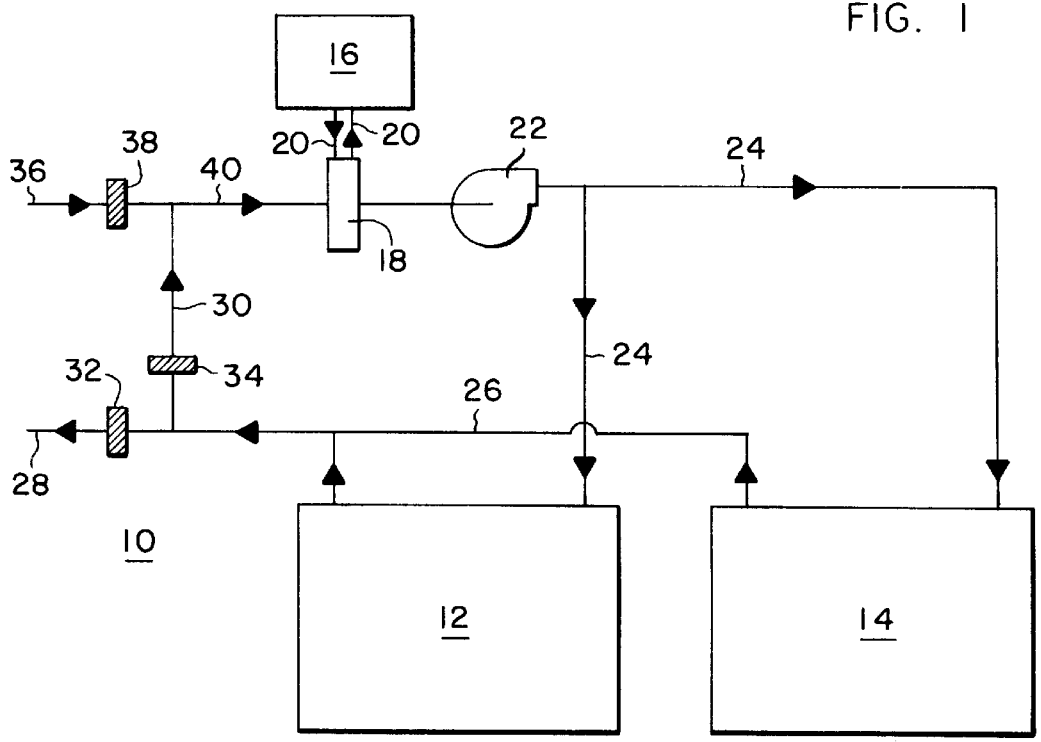
FIG. 1 is a block diagram of an air conditioning system suitable for use with the present invention.

FIG. 1 shows a typical HVAC system 10 including two zones 12 and 14 whose air is to be conditioned. Typically, the air is conditioned, i.e. heated or cooled, by an air conditioning unit 16 which conditions air by means of a coil 18. Such air conditioning units for both heating and cooling purposes are conventional and well known to a person of ordinary skill in the art. Refrigerant is transferred by means of conduits 20 between the coil 18 and the air conditioning unit 16. The conditioned air, i.e. supply air, is impelled by an air handling device such as a fan 22 through ducting 24 to the zones 12, 14 whose air is being conditioned. After use in the zones 12, 14, the return air is returned by ducting 26 and either exhausted from the building by an exhaust 28 or recirculated by means of recirculation ducting 30. An exhaust damper 32 is provided to control the amount of air being exhausted by the exhaust 28 and a recirculating damper 34 is provided to control the amount of air being recirculated through the recirculation duct 30. Additionally, the recirculated air is mixed with outdoor air received from an outdoor air intake 36. The outdoor air passes through and is controlled by an outdoor air damper 38 and is then mixed with the recirculated air. The mixture is directed by supply air ducting 40 to the coil 18 where the air is conditioned and the air conditioning cycle continued.

The present invention is directed to a flow modulation device 50 as shown in FIGS. 2, 3, 4 and 5. The flow modulation device 50 essentially replaces the outdoor air damper 38. Outside air enters from 46 and leaves the flow modulation device 50 at 48. The flow modulation device 50 includes a housing 52, preferably circular, supporting a flow Renken en et al., this patent being assigned to the assignee of the present invention and hereby incorporated by reference. The flow ring sensor 54 is provided to accurately measure the amount of outside air being introduced, although other flow measuring arrangements are also contemplated. A flange 55 may be provided to attach the device 50 to an outside wall or, to provide a smoother transition in entering airflow, a bell mouth 57 may be provided.

Figure 5:
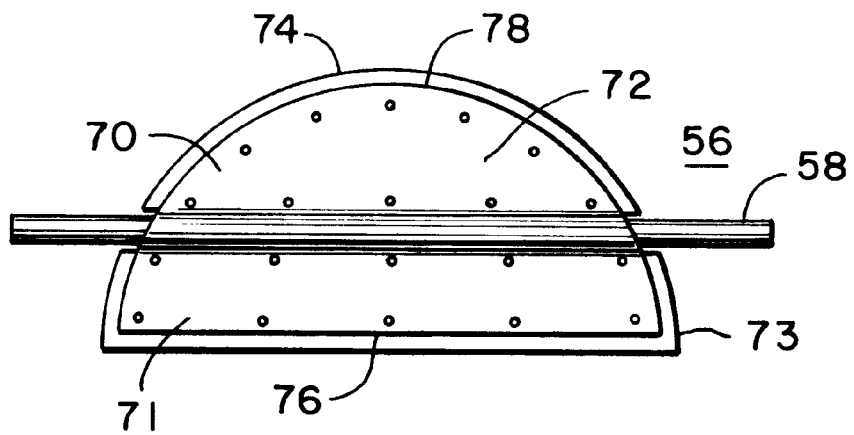
FIG. 5 shows an individual damper blade in accordance with the present invention.

The flow modulation device 50 also includes a damper section 51 having a pair of damper blades 56. Each damper blade 56 is mounted on its own shaft 58, and the shaft 58 rotatably supported by the housing 52. A linking mechanism 60 ensures that the damper blades 56 move in mirror image synchronization. A drive mechanism 62 drives one of the shafts 58 and the linkage mechanism 60 causes the other damper blade 56 to follow the movement caused in the first damper blade 56. A critical aspect of the present invention is the centroidal location of the shaft 58 with respect to the surface 70 of the individual damper blade 56. As shown in FIG. 5, the shaft 58 is located on the surface 70 of the damper blade 56 such that the area 71, 72 of the surface 70 on either side of the shaft 58 is substantially the same. In other words, the area 71 is substantially equal to the area 72 for each damper blade 56. Effectively, the damper blade 56 is easy to modulate since air pressure is balanced on either side of the shaft, and therefore provides fine control with minimal control force.

Figures 2, 4:
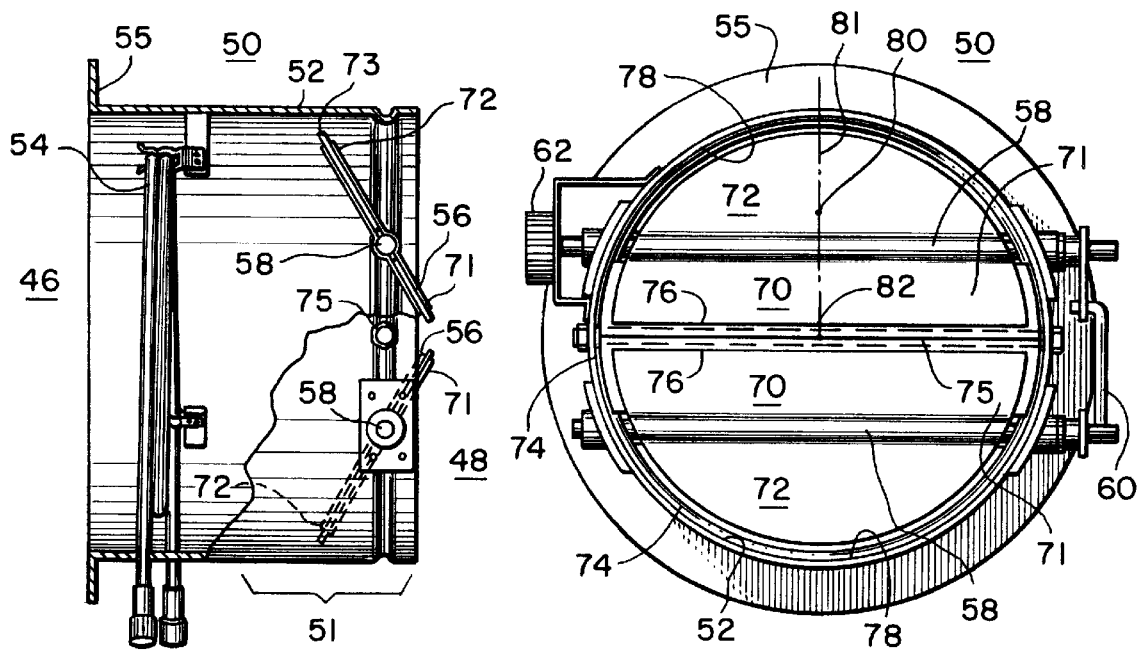
FIG. 2 is a view of the flow modulation device of the present invention from the interior of a building.
FIG. 4 is a side view of the flow modulation device of the present invention.
Figure 3:
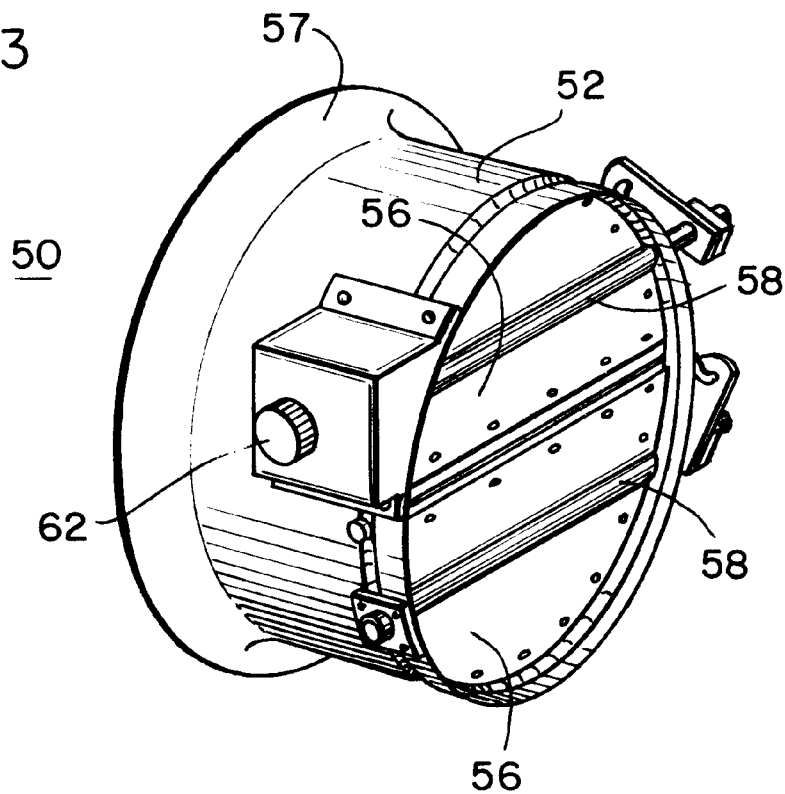
FIG. 3 is a perspective view of the flow modulation device of the present invention.

In the preferred embodiment, the shape of each damper blade 56 is generally half circular with a peripheral edge 73. The peripheral edge 73 includes a substantially straight edge 76 and a curved edge 78. A gasket 74 preferably is attached to the peripheral edge 73 of each damper blade 56 so as to provide a seal when the damper blades 56 are in the closed position as shown in FIG. 2. For ease of assembly and insulative effect, the gasket 74 is preferably in two pieces, each of a size and shape to be sandwiched between the areas 71 on either side of the damper blade 56, or the areas 72 on either side of the damper blade 56. Preferably a sealing support 75 supported by the housing 52 and aligned with the straight edges 76 is provided to act as a blade stop when the damper blades 56 are in a closed position. Alternative sealing arrangements include mirror image lips formed in the damper blades 56 along the straight edge 76, or other conventional sealing engagements such as the gasketless air damper shown in U.S. Pat. No. 4,917,350 to Beyer. This gasketless air damper is assigned to the assignee of the present invention and is hereby incorporated by reference.

As noted and unlike other previous butterfly dampers, the shaft 58 is not located at the straight edge 76, nor is the shaft 58 located in the middle of the damper blade at the midpoint 80 of a perpendicular line 81 from the midpoint 82 of the straight edge 76 as one might expect. Rather, centroidally locating the shaft 58 to form the balanced areas 71, 72 ensures that the damper blades 56 turn easily in response to the various pressures passing through the duct 40.

Figure 9:
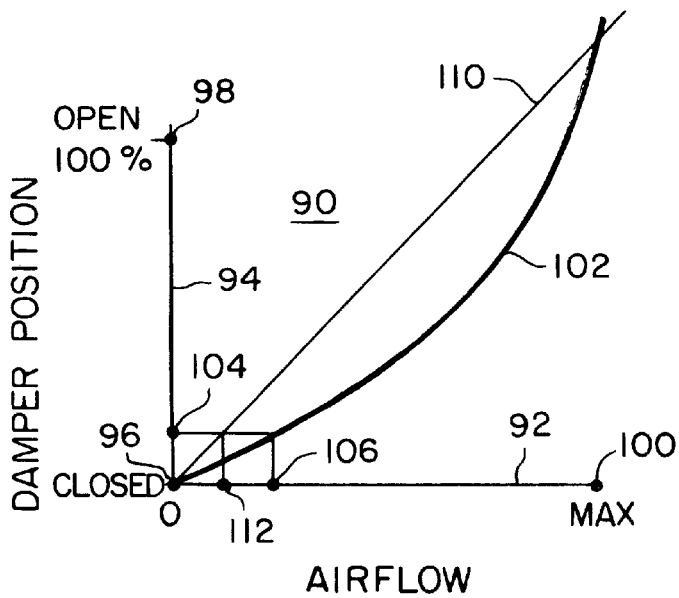
FIG. 9 is a graph of damper position versus airflow for prior art devices and for the present invention.

The centroidal location of the shaft 56 with respect to the surface 70 of the damper blade 56 has an additional unexpected advantage in that airflow is linear across the range from the damper's closed position to the damper's open position. This is illustrated in FIG. 9 with respect to both the present invention and the prior art as shown by graph 90. Airflow is shown on the X axis 92 while damper position is shown on the Y axis 94. On the Y axis 94, the location 96 illustrates the fully closed damper position while the location 98 illustrates the fully open damper position. Similarly, on the X axis 92, location 96 also illustrates the zero airflow position while location 100 illustrates the maximum airflow position. In the prior art, as can be seen from the line 102, airflow is non-linear with respect to damper position. A small change in damper position from the closed position 96 to a position 104 results in a significant nonlinear increase in airflow as shown by position 106. More specifically, the prior art devices let a lot of air through when they are initially opened.

However, airflow in the present invention is linear as shown by line 110. The relation of airflow to damper position is linear, where a small change in damper position such as from location 96 to location 104 results in a small and linear change in airflow as indicated by point 112. Small amounts of airflow can be closely controlled with linear airflow control. The present invention's linear relationship across the entire damper is illustrated by the line 110.

FIGS. 6, 7 and 8 show, in more detail, the drive mechanism 62 which also includes a motor drive gear train release 128 to ensure that the damper blades 56 are placed in a closed position in the event of a power loss. A motor 130 is mounted on a pivoting plate 132, pivoting around a screw 134. The screw 134 is attached to a base 136 which supports a solenoid 138. As shown in FIG. 7, when in the unpowered mode, a spring 140 pushes the plate 132 in a canted position such that the motor drive gear 142 is physically separated from the driven gear 144 by a gap 146.

As shown in FIG. 6, when power is provided to the solenoid 138, the spring 140 is compressed as the solenoid pulls the plate 132 toward the solenoid and engages the motor drive gear 142 with the driven gear 144. As illustrated in FIG. 8, the motor 130 is preferably on the opposite side of the base 136 from the gears 142 and 144.

An alternative embodiment of the present invention is shown in FIGS. 10–14 as a flow swirl generator 150. This alternative embodiment performs the monitoring and modulation of outdoor air as does the flow modulation device 50, but the flow swirl generator 150 of the alternative embodiment also induces a swirl into the outdoor air so as to facilitate turbulent mixing with recirculated air from the duct 30.

Figure 10:
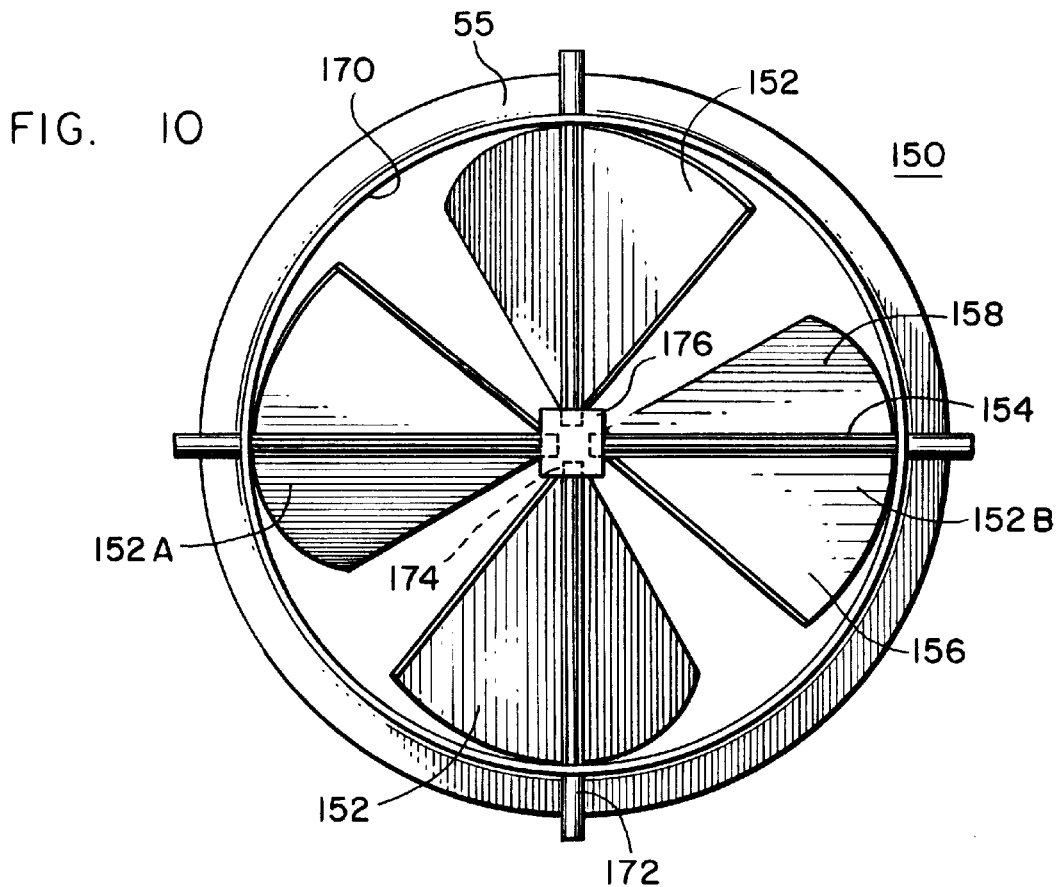
FIG. 10 is an alternative embodiment of the present invention taken in the open position as viewed from the interior of a building.
Figure 11:
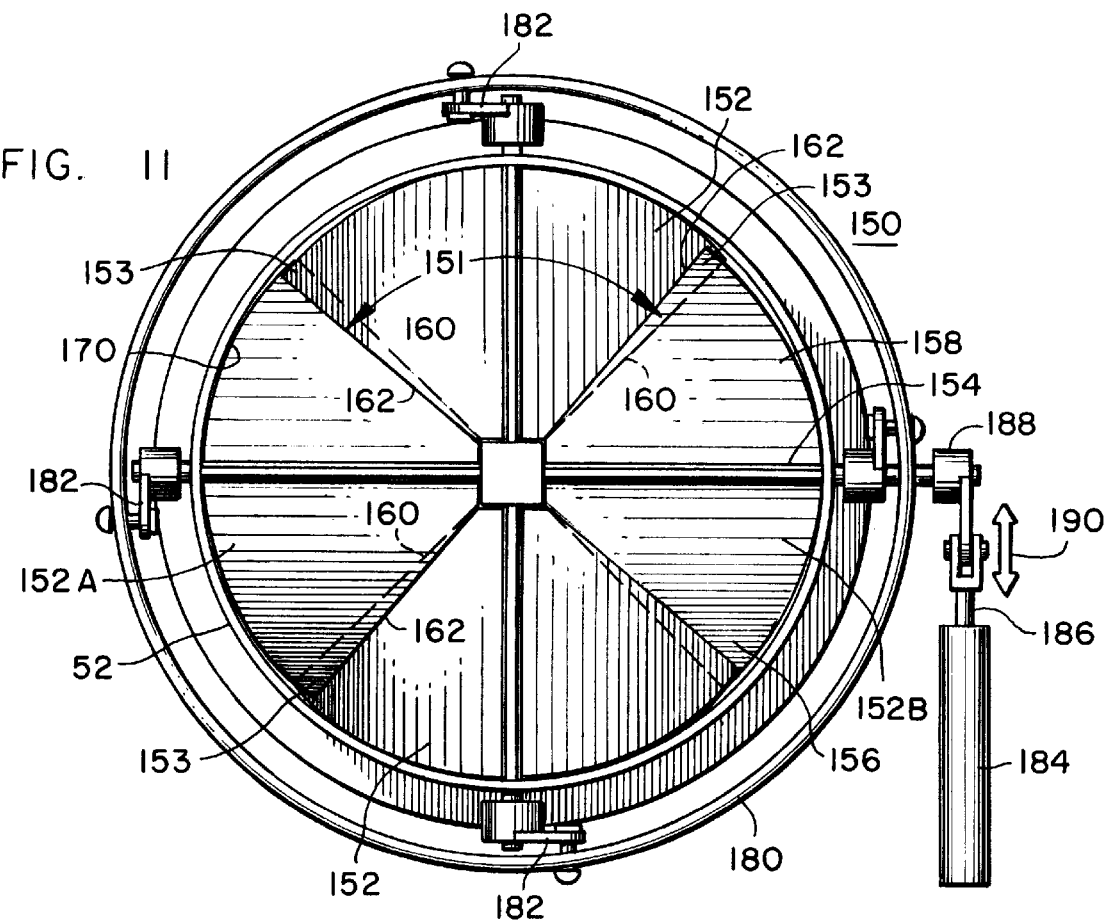
FIG. 11 is the alternative embodiment of FIG. 10 with the dampers in the closed position.
Figure 12:
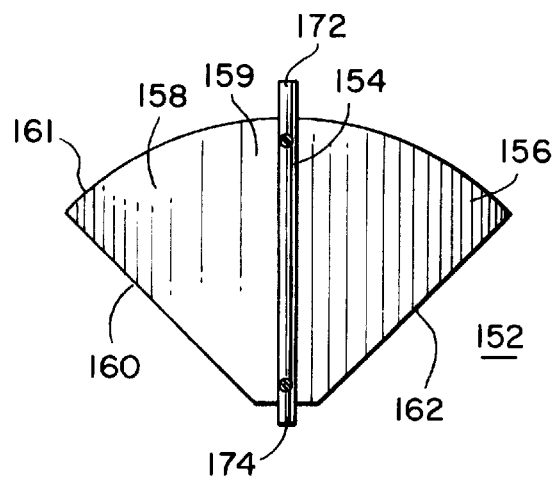
FIG. 12 is the alternative embodiment of FIG. 10 showing a single blade.
Figure 14:
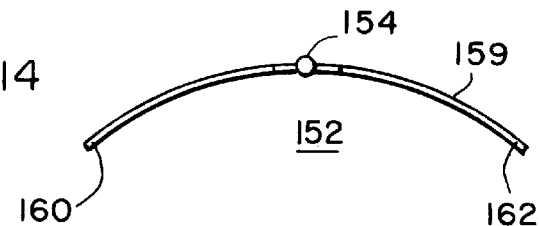
FIG. 14 is an end on view of the single blade of FIG. 12 viewed from the axis of the shaft.

FIG. 10 shows the flow swirl generator 150 in a partially opened position and FIG. 11 shows the flow swirl generator 150 in a fully closed position. In this alternative embodiment, four damper blades 152 are shown although a minimum of two blades is contemplated.

Each blade 152 is centroidally mounted on a shaft 154 so that the area 156, 158 on either side of the shaft 154 is substantially equal, as was previously described in connection with the primary embodiment. Each blade 152 is formed as a curved surface 159 as is shown best by FIG. 14 where the blade 152 is viewed along the axis of the shaft 154. For the four blade flow swirl generator 150, the curved surface 159 of each blade 152 has a smooth arc 151 greater than 90° and preferably 100° or greater. Each blade 152 is formed with a substantially straight leading edge 160, a substantially straight trailing edge 162, and a curved edge 161. The straight edges 160, 162 meet at the shaft 154 and diverge therefrom at an angle greater than 90° for a four blade flow swirl generator 150. The curved edge 161 joins the diverged ends of the edges 160, 162, the curved edge 161 having an arc adapted to the shape of the housing 52.

When in the closed position shown in FIG. 11, the trailing edge 162 and the leading edge 160 of adjacent blades 152 have an area of overlap 153 which provides a better seal. On the curved surface 159, the leading edge 160 of the arc faces into the direction of the entering outdoor air and the trailing edge 162 of the arc is pointed at an angle ranging from 90° to 180° relative to the leading edge 160. In this regard, the angle is selected to be closer to 90° when more turbulence is desired, and selected closer to 180° when less turbulence is desired. This curved surface 159 of the damper blade 152 creates a swirling effect in the entering outside air which causes it to turbulently mix with recirculated air for better mixing effect.

In a three blade flow swirl generator, each blade has a smooth arc greater than 120° between the leading edge 160 and the trailing edge 162. The arc of the curved surface 159 of the damper blade 162 is selected closer to 120° to create more turbulence and selected closer to 240° to create less turbulence.

Figure 13:
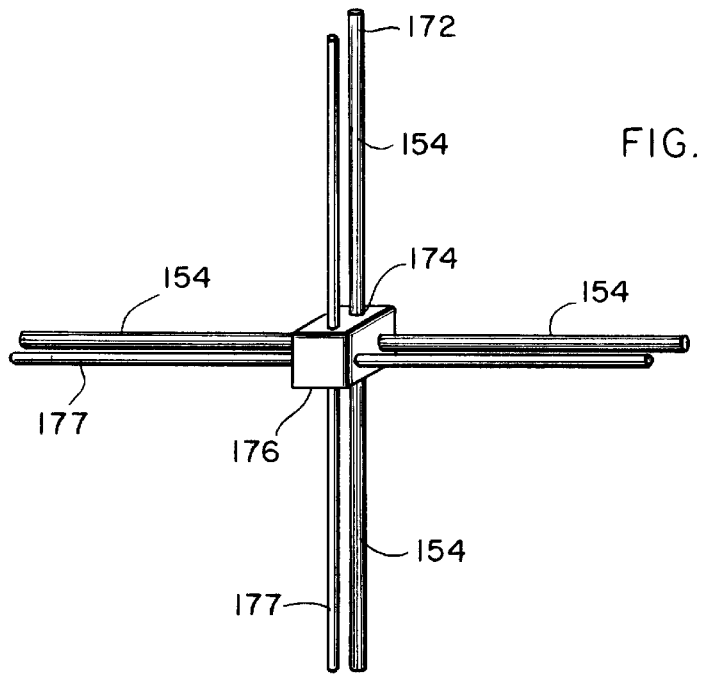
FIG. 13 is the alternative embodiment of FIG. 10 showing the axis and central connection.

As shown in FIG. 13, the individual shafts 154 are not as long as the diameter of the housing 170 of the flow swirl generator 150. Instead, the length of each shaft 154 is approximately that of the radius of the housing 170. This is because opposing damper blades 152a and 152b will turn in opposite directions so that each blade 152 induces swirl in the same direction. A first end 172 of each shaft 154 is rotatably mounted in the housing 170 and a second end 174 is rotatably engaged with a central support 176. The central support 176 is located approximately at the center point of the housing 170 and is held in position by rods 177 affixed between the central support 176 and the housing 170. An actuator ring 180 is used to control the movement of the damper blades 152, although other controlling mechanisms are also contemplated. The actuator ring 180 is movably linked to a connecting rod 182 which in turn is attached to the first end 172 of the shaft 154, preferably outside the housing 52. The connecting rod 182 is rigidly attached to the first end 172 by welding or by other conventional fasteners such as bolts. A conventional linear actuator 184 provides rotational force to the actuating ring 180 as an arm 186 of the actuator 184 is moved in a direction tangent to the actuator ring 180. This causes the shaft 154 to rotate with the movement of the connecting rod 182 and thereby open or close the flow swirl in response to the linear actuator 184. The actuator arm 186 is movably attached to the actuator ring 180 using any conventional device or fastener 188. Additionally, other ways and apparatus for controlling the movement of the damper blades 152 are contemplated including individual actuators or motors on the first ends 172 or an actuator mounted in association with or on the central support 176.

Figure 21:
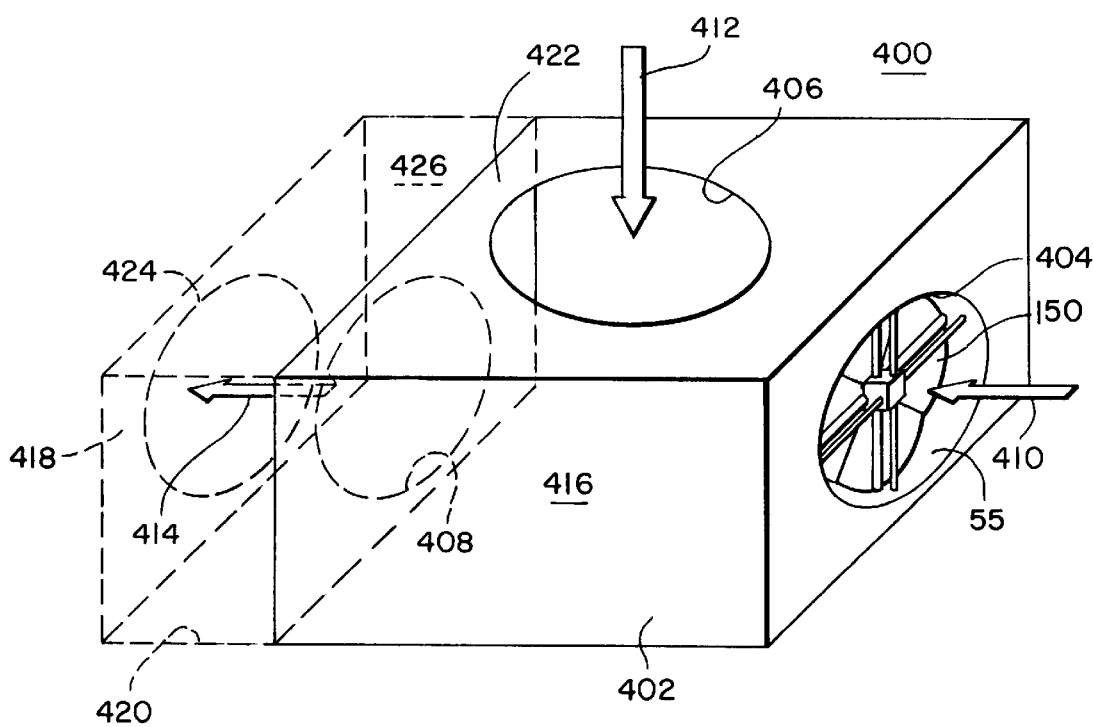
FIG. 21 shows a mixing module adapted for use with the alternative embodiment of FIGS. 10 through 14.

The flow swirl generator 150 may be applied in a mixing module 400 which facilitates easy field installation. The mixing module is shown in FIG. 21 and includes a housing 402 in a shape suitable for easy installation, e.g. rectangular or cubic. The housing 402 includes a fresh air input aperture 404 in which the flow swirl generator 150 is mounted, a recirculated air input aperture 406 adapted for connection to the recirculation ducting 30, and a supply air egress aperture 408 adapted for connection to the supply air ducting 40. Arrow 410 indicates the direction of fresh airflow, arrow 412 indicates the direction of recirculating airflow and arrow 414 indicates the direction of supply airflow.

The housing 402 forms a chamber 416 where the recirculating air and the fresh air are thoroughly mixed due to the turbulating effect of the blades 152 of the flow swirl generator 150. The thoroughly mixed air exits through the supply air egress aperture 408 into the supply air ducting 40. If additional mixing effect is desired, the housing 402 may be extended by adding an extended mixing housing 418 as shown by dashed lines 420. With the removal of a wall 422 containing the supply air egress aperture 408 and the addition of a similar supply air egress aperture 424 in the extended mixing housing 418, an extended mixing chamber 426 is added to the mixing chamber 416. In general, the angle between the selected edge 160 and the trailing edge 162 is selected closer to 90° to generate more turbulence in the smaller volume of chamber 416, and the angle is selected closer to 180° in the greater volume of the combined extended mixing chamber 426 and mixing chamber 415.

Basically, more turbulence is preferred in smaller volumes as to ensure thorough mixing. This is true of three blade, four blade, five blade and other blade systems built in accordance with the teachings of the present invention.

Figure 15:
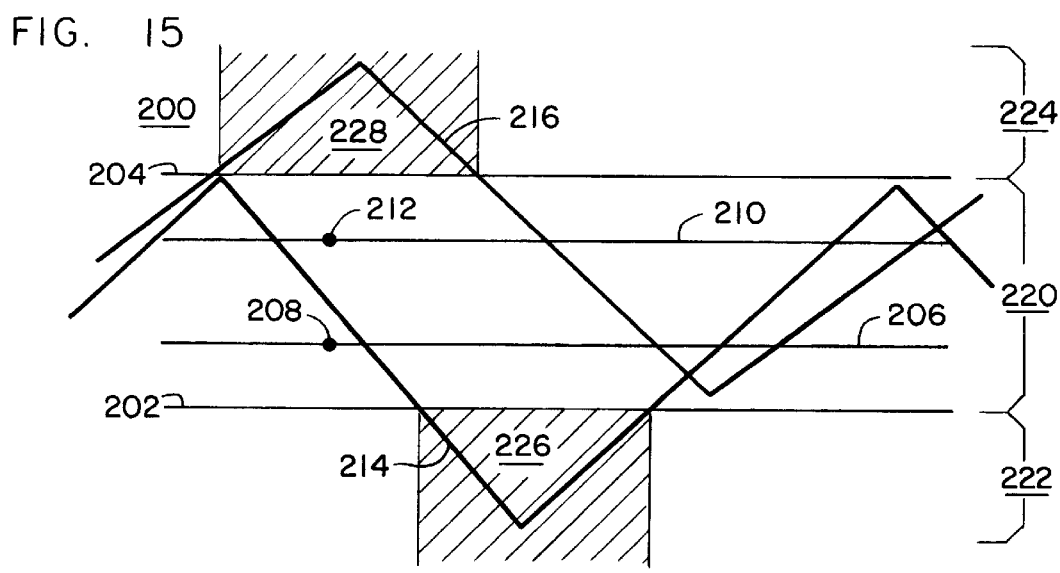
FIG. 15 is a graph of analog signal in accordance with an aspect of the present invention.

Another aspect of the present invention relates to improving the measurement of a value such as airflow through the flow modulation device 50 by improving the resolution of the analog to digital conversion of the electronic signal corresponding to the signal generated by the flow ring sensor 54. This aspect also applies to the measurement of other values such as temperature, humidity, voltage, current, or the like. FIG. 15 shows a graph 200 having a first level of discrimination 202 and a second level of discrimination 204. Any signal received between the first and second levels of discrimination 202, 204 cannot be distinguished due to the limitations in signal discrimination. For example, an analog signal represented by the line 206 as sampled at point 208 is indistinguishable from an analog signal represented by the line 210 as sampled at point 212.

Figure 16:
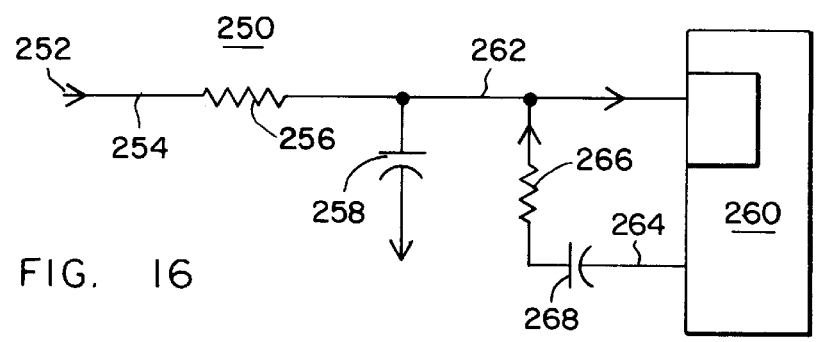
FIG. 16 is a circuit diagram in accordance with the invention as described with respect to FIG. 15.

However, a known signal can be superimposed upon the analog signal using circuits such as that shown in FIG. 16. Circuits or circuitry are defined herein to include hardware, software, and/or firmware. Superimposing such a known signal on the analog signals 206 and 210 respectively results in modulated signals 214 and 216. Whereas both signals had previously been in the area 220 between the lines 202 and 204, portions of the modulating signal 214 now falls below the line 202 in the area 222 and portions of the modulating signal 216 now fall above the line 204 in the region 224. The portion of time that the signal 214 below discrimination line 202 is represented by the region 226, while the portion of time that the line 216 above the line 204 is represented by the region 228. By averaging the signal portions respectively in the regions 220, 222 and 224, the position of the analog signal 212 or 208 between the lines 202 and 204 can be interpolated. Two analog signals 210, 206 are shown merely to provide separate examples demonstrating how the signal represented by the line 206 can be interpolated as closer to the lower discrimination level line 202 while the signal represented by the line 210 can be interpolated to be closer to the discriminator line 204. In practice a single analog signal 210 or 206 is received and the time in each region 222, 224, 226 determined and used as a basis for interpolation. Alternatively and particularly more difficult, the actual areas can be integrated. In practice, it is much easier to time the signal 210 or 206.

This is further illustrated with respect to FIG. 17 using the Table 230. The first column A of the table illustrates the analog signal lines 206 and 210. In the second column B, the discrimination between lines 202 and 204 shows that each of these signals 206, 210 will fall in area 220 and be effectively indistinguishable from each other. Using the present invention is demonstrated in column C where the portion 226 of the modulated signal 24 is found to lie X% in area 222 and the remainder to lie Y% in area 220. This allows an interpolation as to the location of the analog signal 206 with respect to lines 202 and 204 to be determined. Similarly, the modulated signal 216 can be determined to be Z percent in area 220 and W percent in area 224 allowing an interpolation of where the analog signal 210 is with respect to the lines 202 and 204.

The circuit 250 to accomplish this is shown in FIG. 16 and is relatively simple. The analog signal 252 enters on line 254 and is filtered by a resistor 256 and a capacitor 258. The filtered result is forwarded to the analog to digital converter of a microprocessor 260 by means of an electrical connection 262. An output line 264 of the microprocessor 260 having a resistor 266 and an optional capacitor 268 modulates the analog signal on line 262. Preferably, the signal pulsed on line 264 is a fifty percent duty cycle signal which results in a a triangle shaped or saw toothed shaped signal on line 262 due to the long constants of the resistors 266, 256 and the capacitor 258. The use of the optional capacitor 268 eliminates imposing a small DC offset on the original signal. In the preferred embodiment, the resistor 256 is a ten K ohm resistor while the resistor 266 is a 1.5 megaohm resistor. The capacitor 258 is a 4.7 microfarad capacitor while the capacitor 268 is a 0.22 microfarad capacitor.

The signal from the microprocessor 260 on line 264 is a fifty percent duty cycle squarewave with a 200 millisecond period. This signal modulates the signal on line 262 producing a signal such as that represented by the line 308 in FIG. 19. The signal on line 262 is sampled as shown by the flow chart 300 in FIG. 18. The flow chart begins at 302 and initializes a sum at 304 to be a value of zero. 128 eight bit input samples are taken and summed at step 306 over the next 200 milliseconds.

The sum sampled at 306 was found to give an interpolation error which varied according to the strength of the analog signal being input at 254. It is compensated for at step 310 by adding an error correction factor directly related to the magnitude of the modulated signal 308. This correction factor is empirically determined and entered in a lookup table where the modulo 128 of the sum from step 306 is used as the entry value into the lookup table. FIG. 20 is a graph of the compensation factor versus modulo 128 of the sum. The compensation factor is applied at 310 and the flow chart 300 exited at 312.

The resultant analog to digital technique provides better than 13 bit resolution from an 8 bit analog to digital converter. The compensation step 310 alone provides more than an eight times improvement. The flow chart 300, with the compensation step 310 omitted, provides a resolution by itself of approximately ten bits from an eight bit sample. The thirteen bit resolution makes possible accurate airflow measurements from the flow ring 54 ranging from under 100 feet per minute (approximately 0.001 inches water column) to 2500 feet per minute (approximately 1 inch water column). Thus the flow modulation device of the present invention can measure down to five percent of unit airflow, as opposed to the minimum accurate readings of 15 percent unit airflow without the entire technique shown in FIG. 18.

The present invention as directed to a flow modulation device and its alternative embodiment of a flow swirl generator have been disclosed in terms of the specific embodiments described above. A person of ordinary skill in the art will recognize that many alterations and modifications are within that persons skill. Such modifications specifically include varying the number of damper blades for both disclosed embodiments to operate with two, three, four or more damper blades. Other modifications include modifying the shape of the housing 52 to elliptical, rectangular, square or other shapes. Additionally, circuitry as used herein is defined to include software, hardware and firmware, implemented either independently or in combination. A person of ordinary skill in the art will recognize that all such modifications and alterations are contemplated to fall within the spirit and scope of the following claims.

What is claimed for Letters Patent of the United States is as follows:

1. A method of measurement comprising the steps of:
   measuring a value;
   forwarding measured value as an analog signal;

dithering the analog signal to improve resolution;

converting the analog signal to a digital signal; and applying a compensation factor to the digital signal where the compensation factor is a function of the analog signal strength.

2. The method of claim 1 wherein the measured value is airflow, temperature, humidity, voltage or current.

3. A method of providing analog to digital a conversion comprising the steps of:

receiving an analog signal;

dithering the analog signal with a known signal;

taking multiple samples of the dithered signal with an analog to digital converter; and interpolating a resultant digital signal.

4. The method of claim 3 including the further step of determining and applying an interpolation compensation factor to the resultant digital signal.

5. The method of claim 4 wherein the compensation factor is a function of the incoming original analog signal.

6. Apparatus for providing 13 bit resolution of a measured analog signal using an 8 bit analog to digital converter, the apparatus comprising:

an analog sensor which provides a measured signal on an output line A;

a filter circuit receiving the analog signal;

a dither circuit superimposing a known signal on the filtered analog signal; and a microprocessor and analog to digital converter for receiving and sampling the dithered and filtered analog signal.

7. The apparatus of claim 6 further including a compensation circuit which modifies the final signal based on the magnitude of the incoming original analog signal.

8. A method of improving airflow measurement comprising the steps of:

receiving an analog signal indicative of airflow;

superimposing a known signal on the analog signal to result in a modulated signal;

determining a portion of time that the modulated signal is above and first level of discrimination, below a second level of discrimination, or between the first and second levels of discrimination; and determining a position of the analog signal relative to the first and second levels of discrimination based on the determined times.

9. The method of claim 8 wherein the position determining step uses interpolation or integration to determine the position of the analog signal.

10. The method of claim 9 wherein the time portion determining step uses the further step of averaging the portions of time that the modulated signal is above, below or between the first and second levels of discrimination.

* * * * *